United States Patent
Lee et al.

(10) Patent No.: US 11,619,425 B2
(45) Date of Patent: Apr. 4, 2023

(54) HEAT PUMP AND METHOD FOR CONTROLLING COMPRESSOR BASED ON OPERATION OF BOILER

(71) Applicant: LG ELECTRONICS INC., Seoul (KR)

(72) Inventors: Youngmin Lee, Seoul (KR); Jihyeong Ryu, Seoul (KR); Eunjun Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 133 days.

(21) Appl. No.: 17/162,785

(22) Filed: Jan. 29, 2021

(65) Prior Publication Data

US 2021/0239370 A1  Aug. 5, 2021

(30) Foreign Application Priority Data

Jan. 30, 2020 (KR) .................. 10-2020-0011332

(51) Int. Cl.
*F25B 49/02* (2006.01)
*F25B 30/02* (2006.01)
(Continued)

(52) U.S. Cl.
CPC ............ *F25B 30/02* (2013.01); *F25B 25/005* (2013.01); *F25B 33/00* (2013.01); *F25B 41/20* (2021.01); *F25B 49/022* (2013.01); *F24D 3/08* (2013.01); *F24D 3/18* (2013.01); *F24D 12/02* (2013.01); *F24D 17/02* (2013.01);
(Continued)

(58) Field of Classification Search
CPC .......... F25B 30/02; F25B 33/00; F25B 41/20; F25B 49/022; F25B 2600/0251; F25B 2600/2515; F25B 2700/2103; F25B 2700/2106
See application file for complete search history.

(56) References Cited

U.S. PATENT DOCUMENTS 10,260,763 B2 * 4/2019 Huang .................. F25B 29/003

FOREIGN PATENT DOCUMENTS

| CN | 102466375 | 5/2012 |
| CN | 103370577 | 10/2013 |

(Continued)

OTHER PUBLICATIONS

European Search Report dated Jun. 10, 2021 issued in Application No. 21154288.1.

(Continued)

*Primary Examiner* — Jonathan Bradford
(74) *Attorney, Agent, or Firm* — Ked & Associates (57) ABSTRACT

A heat pump may include a compressor configured to compress a refrigerant, a first temperature sensor provided in heating pipes connected to a heating device that heats an indoor space to sense a temperature of fluid flowing through the heating pipes, and a controller. The controller may be configured to determine whether a boiler is operating to heat an indoor space or is operating to supply hot water based on a sensing value of the first temperature sensor. The compressor may operate when the controller determines that the boiler is not operating to heat the indoor space and/or determines that the boiler is operating to supply hot water.

17 Claims, 8 Drawing Sheets

(51) Int. Cl.
  *F25B 41/20* (2021.01)
  *F25B 33/00* (2006.01)
  *F25B 25/00* (2006.01)
  *F24D 3/08* (2006.01)
  *F24D 3/18* (2006.01)
  *F24D 17/02* (2006.01)
  *F24D 12/02* (2006.01)

(52) U.S. Cl.
  CPC ............... *F25B 2313/0231* (2013.01); *F25B 2600/0251* (2013.01); *F25B 2600/2515* (2013.01); *F25B 2700/2103* (2013.01); *F25B 2700/2106* (2013.01)

(56) References Cited

FOREIGN PATENT DOCUMENTS

| | | | | |
|---|---|---|---|---|
| CN | 104838209 | | 8/2015 | |
| CN | 106196258 | | 12/2016 | |
| DE | 2659806 | | 6/1978 | |
| EP | 2103890 | | 9/2009 | |
| EP | 2159495 | | 3/2010 | |
| EP | 2463591 | A1 * | 6/2012 | ............. F24D 12/02 |
| EP | 3252383 | | 12/2017 | |
| KR | 10-2013-0135022 | | 12/2013 | |

OTHER PUBLICATIONS

Chinese Office Action dated May 9, 2022 issued in Application No. 202110108414.6 (English translation attached).

\* cited by examiner

HEAT PUMP AND METHOD FOR CONTROLLING COMPRESSOR BASED ON OPERATION OF BOILER

CROSS-REFERENCE TO RELATED APPLICATION

This application claims priority under 35 U.S.C. § 119 to Korean Application No. 10-2020-0011332 filed on Jan. 30, 2020, whose entire disclosure is hereby incorporated by reference.

BACKGROUND

1. Field

The present disclosure relates to a heat pump.

2. Background

A heat pump is a device that transfers heat from a low temperature source to a high temperature source and vice versa. The heat pump may include an outdoor unit and an indoor unit. The outdoor unit may include a compressor and an outdoor heat exchanger, and the indoor unit may include an expansion valve and an indoor heat exchanger.

The heat pump may be used to heat an indoor space (e.g., by heating indoor air) or to generate hot water, and heating of the air or water may occur through heat exchange of a refrigerant instead of through fossil fuels. When the heat pump is used to provide hot water (i.e., operating as a hot water supply), efficiency of the heat pump and an amount of hot water produced may be rapidly reduced when an outdoor temperature is lowered by a predetermined amount or more (or alternatively decreases to a predetermined temperature or lower). In the related art, when the outdoor temperature is lowered by the predetermined amount or reaches the predetermined temperature, a boiler interlock may be used such that a boiler, instead of or in addition to the heat pump, provides the heat.

To supply hot water quickly (as opposed to heating an indoor space quickly), both the heat pump and the boiler may operate as a hot water supply to provide hot water before operating to heat the indoor space. When the outdoor temperature is lowered by the predetermined amount, the boiler, instead of the heat pump, may be used as a heater to heat the indoor space. If the boiler is used to provide hot water due to a demand of hot water, heating of the indoor space may be paused, and an indoor temperature may be lowered. It is difficult for an operation of the heat pump and the boiler to be synchronized and/or interrelated because heat pumps and boilers are mostly products of different manufacturers. For example, it is difficult to configure a control of the heat pump to determine whether the boiler has stopped operating as a heater to heat the indoor air and started operating as a hot water supplier to provide hot water. An operation status of one is not monitored by the other.

To solve this problem, water may be stored in a hot water tank and heated through the heat pump, while the boiler continues to heat the indoor space. However, since the hot water tank is separately provided to supply hot water, installation costs are increased, which harms price competitiveness of the system. In addition, efficiency of the heat pump may be reduced in colder temperatures, and exposure of the hot water tank to cold temperatures further reduces efficiency.

BRIEF DESCRIPTION OF THE DRAWINGS

Embodiments will be described in detail with reference to the following drawings in which like reference numerals refer to like elements, and wherein:

FIGS. 5 to 7C are views referred to for explanation of a method of operating a heat pump.

DETAILED DESCRIPTION

Figure 1:
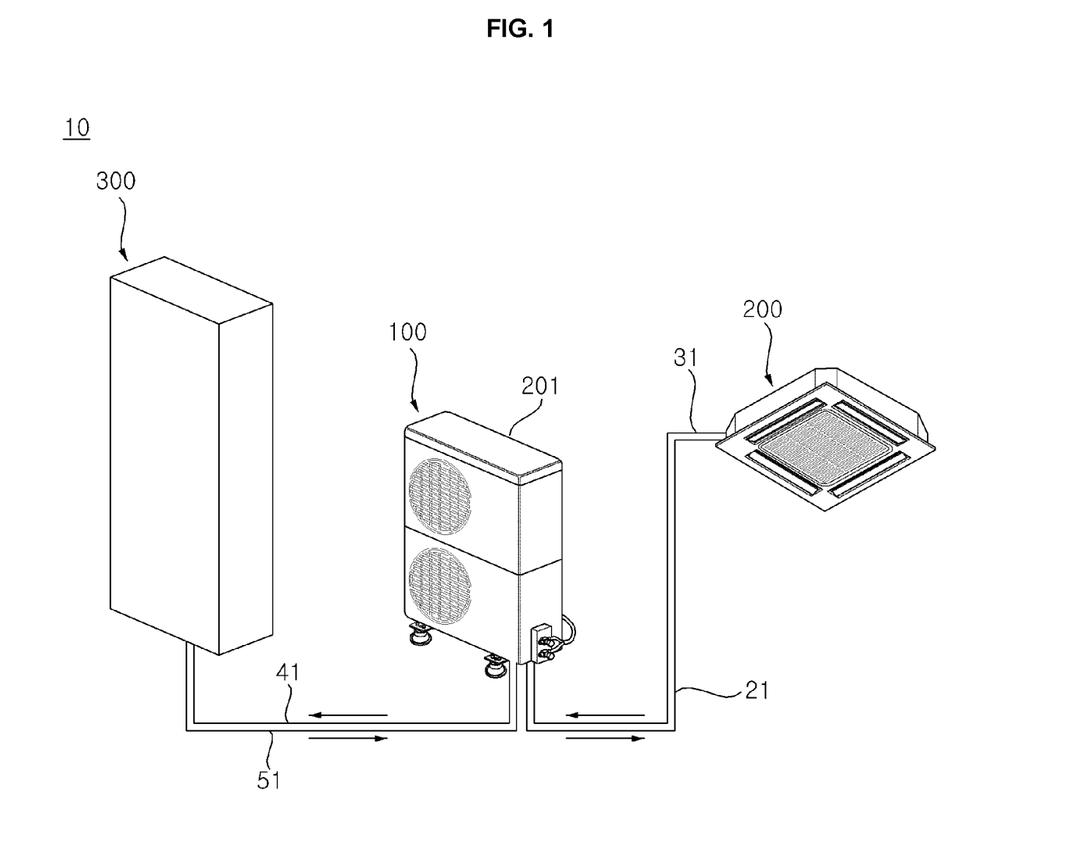
FIG. 1 is a view schematically illustrating a heat pump according to an embodiment.
Figure 2:
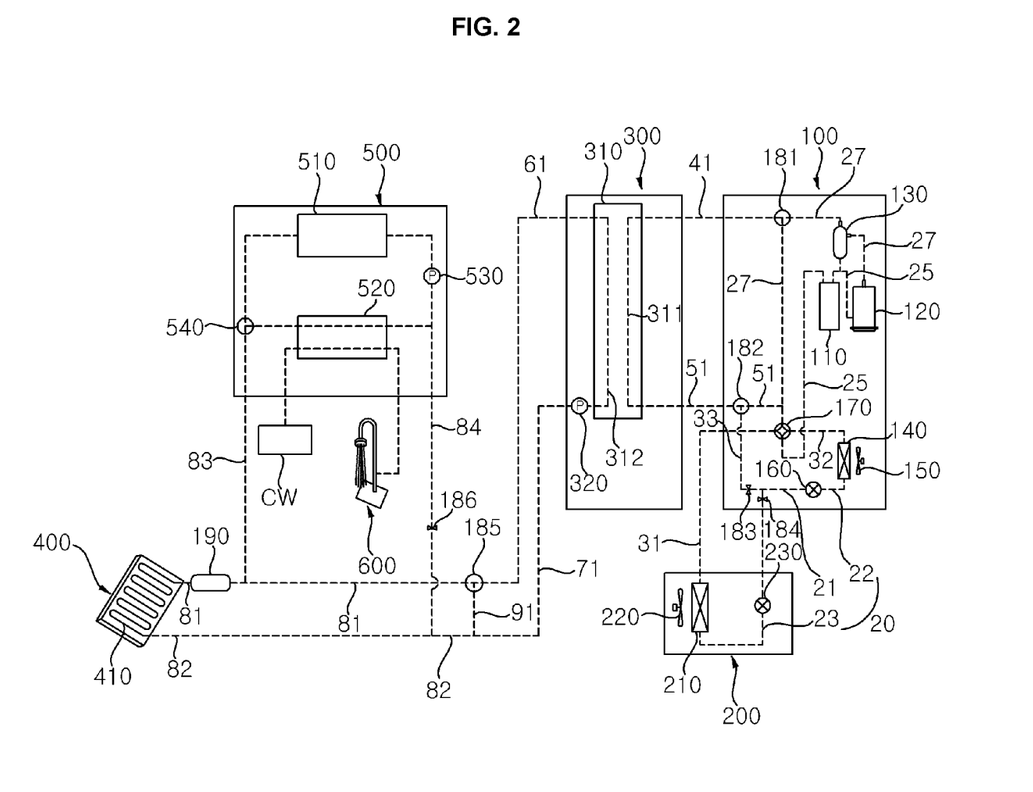
FIG. 2 is a block diagram of a system including a heat pump according to an embodiment.

Referring to FIGS. 1 and 2, a heat pump 10 may include an outdoor unit 100, an indoor unit 200, and/or a heat exchange device or intermediate heat exchange assembly 300 to exchange heat between compressed refrigerant and water or fluid.

A heat pump system may include the heat pump 10, a heating device or heater 400 and/or a boiler 500 to perform indoor heating. Indoor heating may refer to heating indoor air of an indoor space.

The outdoor unit 100 may include a compressor 120 configured to compress a refrigerant, an accumulator 110 provided in a suction passage 25 of the compressor 120 to prevent liquid refrigerant from flowing into the compressor 120, an oil separator 130 provided in a discharge passage 27 of the compressor 120. The oil separator 130 may separate oil from the refrigerant and oil discharged from the compressor 120, and may recover the separated oil to the compressor 120 and/or a switching valve 170, which may be used to select or change a refrigerant flow path depending on a heating/cooling operation.

The outdoor unit 100 may further include a plurality of sensors, valves, etc. The outdoor unit 100 and the indoor unit 200 may include heat exchangers 140 and 210, respectively, fans 150 and 220, respectively, and/or expansion mechanisms (e.g., expansion valves) 160 and 230, respectively. The fan 150 and expansion mechanism 160 of the outdoor unit 100 may be referred to as an outdoor fan 150 and outdoor expansion mechanism 160. The fan 220 and expansion mechanism 230 of the indoor unit 200 may be referred to as an indoor fan 220 and an indoor expansion mechanism 230.

The outdoor and indoor units 100 and 200 may perform air conditioning to cool indoor air or heating to heat indoor air according to a flow direction of a refrigerant. For example, the indoor unit 200 may receive compressed refrigerant from the outdoor unit 100 and discharge hot air or cold air into the room.

The outdoor heat exchanger 140 may condense or evaporate a refrigerant. The outdoor heat exchanger 140 may be configured as a heat exchanger to perform heat exchange between outdoor air and a refrigerant, or be configured as a heat exchanger to perform heat exchange between cooling water or fluid and a refrigerant.

When the outdoor heat exchanger 140 is configured to heat exchange outdoor air with refrigerant, the outdoor fan 150 may be provided at a side of the outdoor heat exchanger 140 and guide outdoor air to the outdoor heat exchanger 140 to promote heat dissipation of the refrigerant. Hereinafter, a case where the outdoor heat exchanger 140 is configured as an air-refrigerant heat exchanger in which outdoor air and refrigerant are heat exchanged with each other is described as an example.

The outdoor heat exchanger 140 may be connected to the indoor heat exchanger 210 and a heat exchanger connection pipe 20. The expansion mechanisms 160 and 230 may be installed in the heat exchanger connection pipe 20.

The heat exchanger connection pipe 20 may include a first connection pipe 21 to which the outdoor expansion device 160 and the indoor expansion device 230 are connected, a second connection pipe 22 to which the outdoor heat exchanger 140 and the outdoor expansion device 160 are connected, and a third connection pipe 23 to which the indoor heat exchanger 210 and the indoor expansion device 230 are connected. The first connection pipe 21 may alternatively be referred to as an expansion device connection pipe, the second connection pipe 22 may alternatively be referred to as an "outdoor connection pipe" or an "outdoor heat exchanger-outdoor expansion device connection pipe," and the third connection pipe 23 may alternatively be referred to as an "indoor connection pipe" or an "indoor expansion device-indoor heat exchanger connection pipe."

The indoor heat exchanger 210 may be a heat exchanger that cools or heats a room through heat exchange between indoor air and a refrigerant. The indoor fan 220 may be provided at a side of the indoor heat exchanger 210 to guide indoor air to the indoor heat exchanger 210.

In the case of a cooling mode in which the heat pump 10 cools the room through the indoor unit 200, the heat exchanger 210 may function as an evaporator, and the refrigerant compressed by the compressor 120 of the outdoor unit 100 may sequentially pass through the outdoor heat exchanger 140, the expansion mechanisms 160 and 230, the indoor heat exchanger 210, and the compressor 120. In the case of a heating mode in which the heat pump 10 heats the room through the indoor unit 200, the heat exchanger 210 may function as a condenser, and the refrigerant compressed by the compressor 120 of the outdoor unit 100 may sequentially pass through the indoor heat exchanger 210, the expansion mechanisms 160 and 230, the outdoor heat exchanger 140, and the compressor 120.

The switching valve 170 may change a flow direction of the refrigerant so that the refrigerant flows in the order of the compressor 120, the outdoor heat exchanger 140, and the indoor heat exchanger 210, or in the order of the compressor 120, the indoor heat exchanger 210, and the outdoor heat exchanger 210. The switching valve 170 may be connected to the compressor 120 through the compressor suction passage 25 and the compressor discharge passage 27. The switching valve 170 may be connected to the indoor heat exchanger 210 through an indoor heat exchanger connection pipe 31. The switching valve 170 may be connected to the outdoor heat exchanger 140 through an outdoor heat exchanger connection pipe 32.

The outdoor unit 100 may include a refrigerant control valve 181 configured to selectively supply refrigerant from the compressor discharge passage 27 to the heat exchange device 300 or the switching valve 170. When the refrigerant control valve 181 is configured as a three-way valve, the refrigerant control valve 181 may be provided at the compressor discharge passage 27. A heat exchange device supply passage 41 to supply the refrigerant to the heat exchange device 300 may be branched from the refrigerant control valve 181.

The outdoor unit 100 may further include an auxiliary refrigerant control valve 182. The auxiliary refrigerant control valve 182 may operate so that the refrigerant transferred from the heat exchange device 300 to the outdoor unit 100 is supplied to a heat exchanger bypass passage 33 or to the switching valve 170. The refrigerant control valve 181 and the auxiliary refrigerant control valve 182 may alternatively be referred to as first and second refrigerant control valves. The refrigerant control valve 181 and/or the auxiliary refrigerant control valve 183 may be configured as a three-way valve.

The outdoor unit 100 may further include a heat exchanger bypass valve 183 and a liquid refrigerant valve 184. The heat exchanger bypass valve 183 may be provided in the heat exchanger bypass passage 33 to regulate a flow of refrigerant. The liquid refrigerant valve 184 may be provided in a passage between the heat exchanger bypass passage 33 and the indoor expansion mechanism 230 to regulate the flow of the refrigerant.

The heat exchanger bypass valve 183 may be opened during heating. The heat exchanger bypass valve 183 may be closed during cooling or when the heat pump 100 performs a simultaneous air conditioning and heating function during a simultaneous operation. The liquid refrigerant valve 184 may be opened during cooling or during the simultaneous operation, and be closed during heating.

The heat exchange device 300 may receive compressed refrigerant from the outdoor unit 100 through the heat exchange device supply passage 41. The heat exchange device 300 may deliver the refrigerant to the outdoor unit 100 through a heat exchange device recovery passage 51.

The heat exchange device 300 may include a water-refrigerant heat exchanger or intermediate heat exchanger 310 to exchange heat between water or fluid and refrigerant supplied from the outdoor unit 100. The water-refrigerant heat exchanger 310 may be composed of a double tube heat exchanger in which a refrigerant passage 311 and a water passage 312 are formed inside/outside with a heat transfer member interposed therebetween. The water-refrigerant heat exchanger 310 may also be composed of a plate-type heat exchanger in which the refrigerant passage 311 and the water passage 312 are alternately formed with a heat transfer member therebetween. Hereinafter, a case where the water-refrigerant heat exchanger 310 is configured as a plate heat exchanger will be described as an example.

The refrigerant passage 311 of the water-refrigerant heat exchanger 310 may be connected to the heat exchange device supply passage 41 and the heat exchange device recovery passage 51. The refrigerant supplied to the water-refrigerant heat exchanger 310 through the heat exchanger supply passage 41 may be heat-exchanged while flowing through the refrigerant passage 311 and be transferred to the outdoor unit 100 through the heat exchanger recovery passage 51.

The water passage 312 of the water-refrigerant heat exchanger 310 may be connected to a hot-water pipe or water discharge pipe 61 through which water is discharged from the water-refrigerant heat exchanger 310 and a cold-water pipe or water supply pipe 71 through which water is supplied to the water-refrigerant heat exchanger 310. A recovery pump 320 to pump water circulating through the water-refrigerant heat exchanger 310 may be provided in the cold-water pipe 71. The recovery pump 320 may circulate water through the water-refrigerant heat exchanger 310 even when the refrigerant is not supplied from the outdoor unit 100 to the heat exchanger 300 to prevent freezing.

The heating device 400 may include a heat dissipation tube 410, and heat an indoor space (e.g., an indoor floor or wall) using hot water flowing along the heat dissipation tube 410. The heating device 400 may be connected to a heating supply pipe 81 and a heating recovery pipe 82.

Water supplied through the heating supply pipe 81 may be heat-exchanged while flowing through the heat dissipation pipe 410, and be discharged through the heating recovery pipe 82. The heating supply pipe 81, the heat dissipation pipe 410, and the heating recovery pipe 82 may collectively be referred to as heating pipes. The heating supply pipe 81 may be connected to the hot-water pipe 61, and the heating recovery pipe 82 may be connected to the cold-water pipe 71.

The heat pump 10 may further include a temperature sensor 190 provided in the heating pipes and detect a temperature of water flowing through the heating pipes 81, 410, and 82. For example, the temperature sensor 190 may be provided in the heating supply pipe 81 among the heating pipes 81, 410, and 82 to detect the temperature of water supplied to the heating device 400.

A hot water supply control valve 185 may be provided between or connect the heating supply pipe 81 and the hot-water pipe 61. When the hot water supply control valve 185 is opened, water may flow from the hot-water pipe 61 to the heating supply pipe 81. When the hot water supply control valve 185 is closed, the flow of water between the hot-water pipe 61 and the heating supply pipe 81 may be blocked, so that water may not flow from the hot-water pipe 61 to the heating supply pipe 81.

When the hot water supply control valve 185 is configured as a three-way valve, the hot water supply control valve 185 may be connected to a bypass pipe 91, which may be connected to the cold-water pipe 71. Water may flow from the hot-water pipe 61 to the cold-water pipe 71 when the hot water supply control valve 185 is closed.

The boiler 500 may include a combustion heating unit or combustor 510 that heats water by burning fossil fuels and may also include a boiler heat exchange device or boiler heat exchanger 520 to exchange heat between water heated by the combustion heating unit 510 and water supplied from a water supply CW. When the boiler 500 provides hot water, the boiler 500 may heat water through the combustion heating unit 510 and transfer the heated water to the boiler heat exchange device 520, and water supplied from the water supply CW may be heated through heat exchange with water heated by the combustion heating unit 510 and then supplied to a hot water supply device or dispenser 600 (e.g., a faucet, spicket, or shower head).

As an alternative, the fluid flowing through the heating device 400, the hot water pipe 61, the water supply pipe 71, the heating supply pipe 81, the heating recovery pipe 82, etc. may be a refrigerant, in which case, such refrigerant may be referred to as a first refrigerant, while the refrigerant flowing through indoor unit 200, outdoor unit 200, etc. may be referred to as a second refrigerant. In such a case, the boiler heat exchange device 520 may be a water-refrigerant heat exchanger implemented as a plate-type heat exchanger or double tube heat exchanger so that the first refrigerant may be heat exchanged with the water supplied from the water supply CW. Once heated, the water may be supplied to the user via the hot water supply device 600.

The boiler 500 may further include a boiler pump 530 that pumps water or fluid circulating through the boiler 500. The boiler 500 may further include a boiler bypass valve 540, which may be configured as a three-way valve.

When the boiler 500 provides a heating function to heat an indoor space, the boiler bypass valve 540 may be controlled so that water heated by the combustion heating unit 510 flows through the boiler supply pipe 83. When the boiler 500 provides a hot water supply function to heat water ultimately supplied through the hot water supply device 600, the boiler bypass valve 540 may operate to transfer water heated by the combustion heating unit 510 to the boiler heat exchange device 520.

The boiler 500 may be connected to the heating supply pipe 81 and the heating recovery pipe 82 through the boiler supply pipe 83 and a boiler recovery pipe 84. Water heated in the boiler 500 may flow to the heating supply pipe 81 through the boiler supply pipe 83, and water discharged from the heating device 400 to the heating recovery pipe 82 may flow to the boiler 500 through the boiler recovery pipe 84.

The heat pump 10 may further include a boiler valve 186 provided in the boiler recovery pipe 84 to regulate a flow of water. For example, when the boiler 500 does not operate and the heat pump 10 provides a heating function to heat an indoor space, the boiler valve 186 may be closed and/or configured to block a flow of water flowing from the heating recovery pipe 82 to the boiler 500. When the boiler 500 provides the heating function, the boiler valve 186 may be opened, and water discharged from the heating device 400 to the heating recovery pipe 82 may be transferred to the boiler 500.

The heat pump 10 may control the boiler 500 to be turned on or turned off. The heat pump 10 may turn on or off the boiler 500 without communicating directly with the boiler 500. For example, the heat pump 10 may transmit a signal to a component (e.g. a switch) that transmits a power signal to the boiler 500 to turn the boiler 500 on or off.

Even when the boiler 500 is turned off by the heat pump 10, the boiler 500 may be turned on when the user requests the use of hot water (e.g., by turning a faucet and/or the hot water supply device 600 on), and the boiler 500 may supply hot water to the hot water supply device 600 by using the water heated via the boiler heat exchange device 520.

Figure 3:
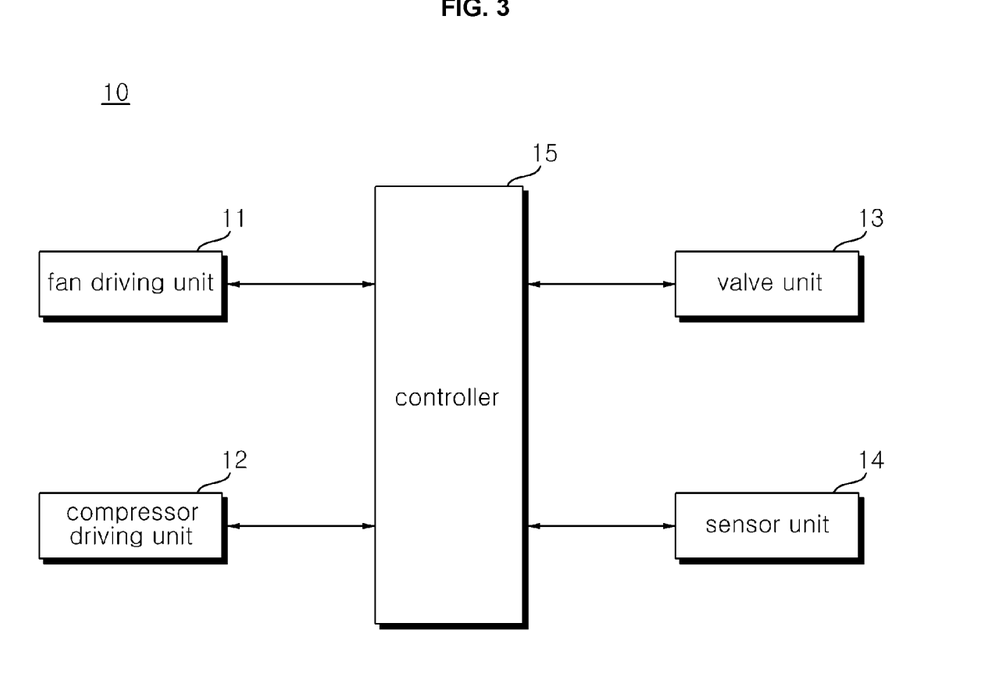
FIG. 3 is a block diagram of a heat pump according to an embodiment.

Referring to FIG. 3, the heat pump 10 may include a fan drive 11, a compressor drive 12, a valve assembly 13, a sensor assembly 14, and/or a controller 15. The fan drive 11 may drive at least one fan included in the heat pump 10 (e.g., the indoor fan and/or outdoor fan 220 and/or 150). The fan drive 11 may include a rectifier that rectifies and outputs alternating current (AC) power to direct current (DC) power, a dc capacitor that stores a pulsating voltage from the rectifier, an inverter that includes a plurality of switching elements and converts DC power to 3-phase AC power at a predetermined frequency, and/or a motor that drives the fans 150 and 230 according to the 3-phase AC power output from the inverter. The fan drive 11 may include components to drive the outdoor fan 150 and the indoor fan 220, respectively.

The compressor drive 12 may drive the compressor 120. The compressor drive 12 may include a rectifier that rectifies and outputs AC power to DC power, a dc capacitor that stores a pulsating voltage from the rectifier, an inverter that includes a plurality of switching elements and converts DC power to 3-phase AC power at a predetermined frequency, and/or a compressor motor that drives the compressor 120 according to the three-phase AC power output from the inverter.

The valve assembly 13 may include at least one valve (e.g., the switching valve 170, the auxiliary refrigerant control valve 182, the heat exchanger bypass valve 183, the liquid refrigerant valve 184, the hot water supply control valve 185, and/or the boiler valve 186). At least one valve included in the valve assembly 13 may operate under the control of the controller 15.

The sensor assembly 14 may include at least one sensor and transmit data on a sensing value sensed through at least one sensor to the controller 15. At least one sensor included in the sensor assembly 14 may be provided inside the outdoor unit 100 and/or the indoor unit 200. For example, the sensor assembly 14 may include a heat exchanger temperature sensor provided inside the outdoor heat exchanger 140 to detect a condensation temperature or an evaporation temperature, a pressure sensor to detect a pressure of gaseous refrigerant flowing through each pipe, and/or a pipe temperature sensor to detect a temperature of a fluid flowing through each pipe.

The sensor assembly 14 may include an indoor temperature sensor to detect an indoor temperature and/or an outdoor temperature sensor to detect an outdoor temperature. For example, the outdoor temperature sensor may be provided in the outdoor unit 100, and the indoor temperature sensor may be provided in the indoor unit 200. The sensor assembly 14 may also include the temperature sensor 190 provided in the heating pipes connected to the heating device 400 to detect a temperature of water flowing through the heating pipes.

The controller 15 may be connected to each component or device (e.g., sensors of the sensor assembly 14, valves of the valve assembly 13, fan drive 11, and compressor drive 12) included in the heat pump 10 and control an overall operation of each component. The controller 15 may transmit and receive data between components included in the heat pump 10. The controller 15 may be provided in at least one of the indoor unit 200, the heat exchange device 300, and/or the outdoor unit 100.

The controller 15 may include at least one processor to control the overall operation of the heat pump 10. The processor may be a general processor such as a central processing unit (CPU). The processor may be a dedicated device such as an application-specific integrated circuit (ASIC) or another hardware-based processor.

The controller 15 may control the operation of the fan drive 11. For example, the controller 15 may change a rotation speed of the outdoor and indoor fans 150 and 230 by changing a frequency of the three-phase AC power output to the outdoor fan motor through operation control of the fan drive 11.

The controller 15 may control the operation of the compressor drive 12. For example, the controller 15 may change an operating frequency of the compressor 120 by changing a frequency of the three-phase AC power output to the compressor motor through operation control of the compressor drive 12.

The controller 15 may control an operation of at least one valve included in the valve assembly 13 according to a function provided by the heat pump 10. For example, when the heat pump 10 provides a heating function, the controller 15 may control the heat exchanger bypass valve 183 to be opened, and control the liquid refrigerant valve 184 to be closed. When the heat pump 10 does not provide the heating function, the controller 15 may control the hot water supply control valve 185 to be closed so that water does not flow from the hot-water pipe 61 to the heating supply pipe 81.

The controller 15 may control each component or device included in the heat pump 10 based on a sensing value of at least one sensor included in the sensor assembly 14. For example, The controller 15 may determine a function provided by the heat pump 10 based on a sensing value of the outdoor temperature sensor. When the sensing value of the outdoor temperature sensor is less than a predetermined temperature, the controller 15 may stop an operation of the compressor 120 so that the heat pump 10 does not provide the heating function. The predetermined temperature may be a temperature of outdoor air at which an efficiency of the heat pump 10 is significantly lowered (e.g. −7° C.).

The controller 15 may determine an operating state of the boiler 500 based on the sensing value of the temperature sensor 190. For example, the controller 15 may calculate a rate of change of water or fluid temperature based on the sensing value of the temperature sensor 190, and determine whether the boiler 500 is providing the heating function according to the calculated rate of change of the water temperature. Alternatively or in addition thereto, the controller 15 may determine whether the boiler 500 provides the heating function when the sensing value of the outdoor temperature sensor is less than the predetermined temperature.

The controller 15 may control power of the boiler 500 to be on or off. For example, the heat pump 10 may further include a component (e.g. a switch) to transmit a power signal to the boiler 500, and the controller 15 may transmit a signal to the component (e.g. a switch) to turn the boiler 500 on or off.

Figure 4:
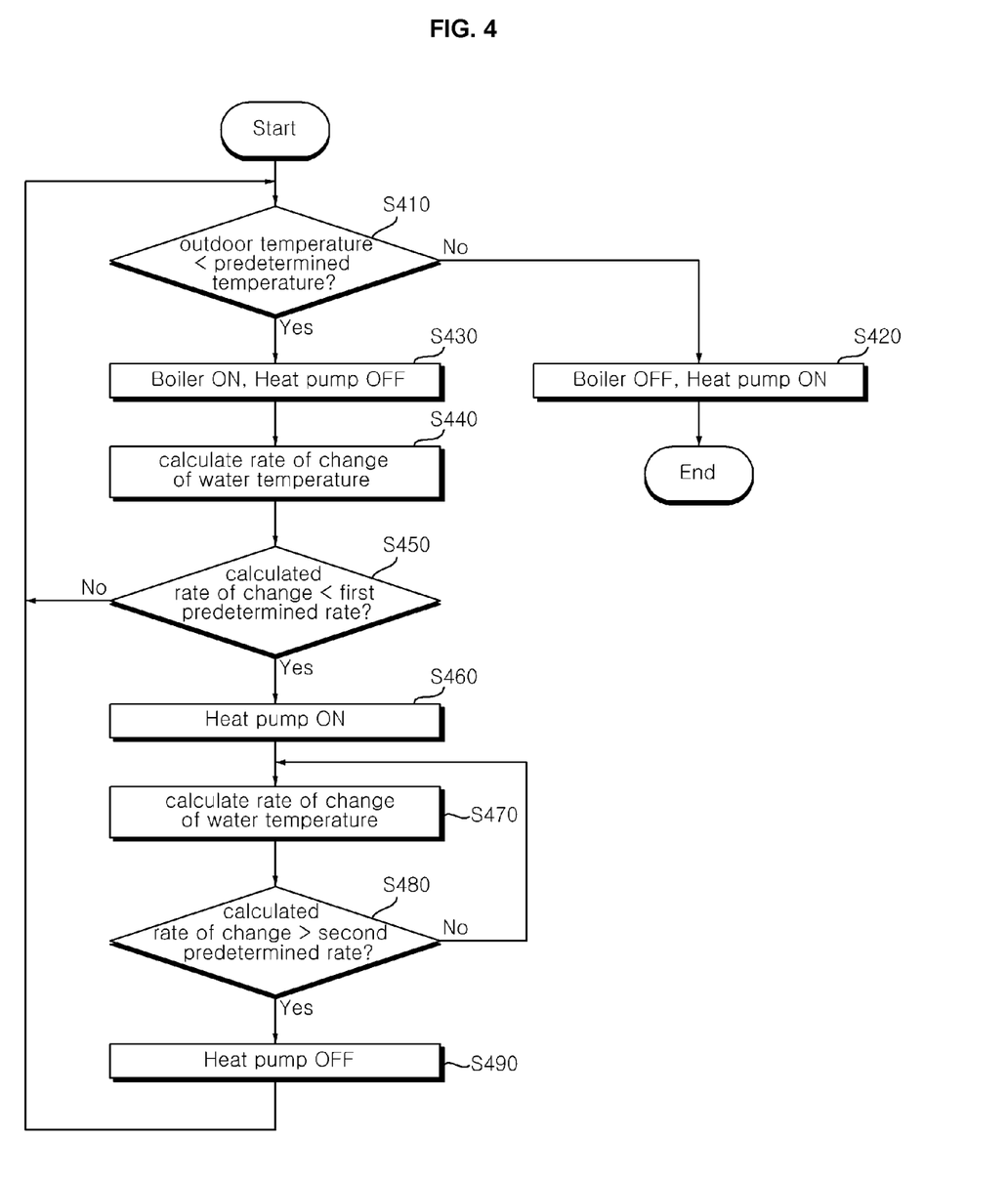
FIG. 4 is a flowchart illustrating a method of operating a heat pump according to an embodiment.

Referring to FIGS. 4 (showing a block diagram of the method) and 5-7C (showing the devices referred to), the heat pump 10 may determine whether an outdoor temperature is less than a predetermined temperature (operation or step S410). For example, the heat pump 10 may determine whether a sensing value of the outdoor temperature sensor is less than the predetermined temperature (e.g. −7° C.) at which the efficiency of the heat pump 10 is lowered.

When the outdoor temperature is higher than the predetermined temperature ("No" in step S410), the heat pump 10 may control the boiler 500 to be turned off, and control each component included in the heat pump 10 to be turned on to provide a heating function (operation or step S420).

Figure 5:
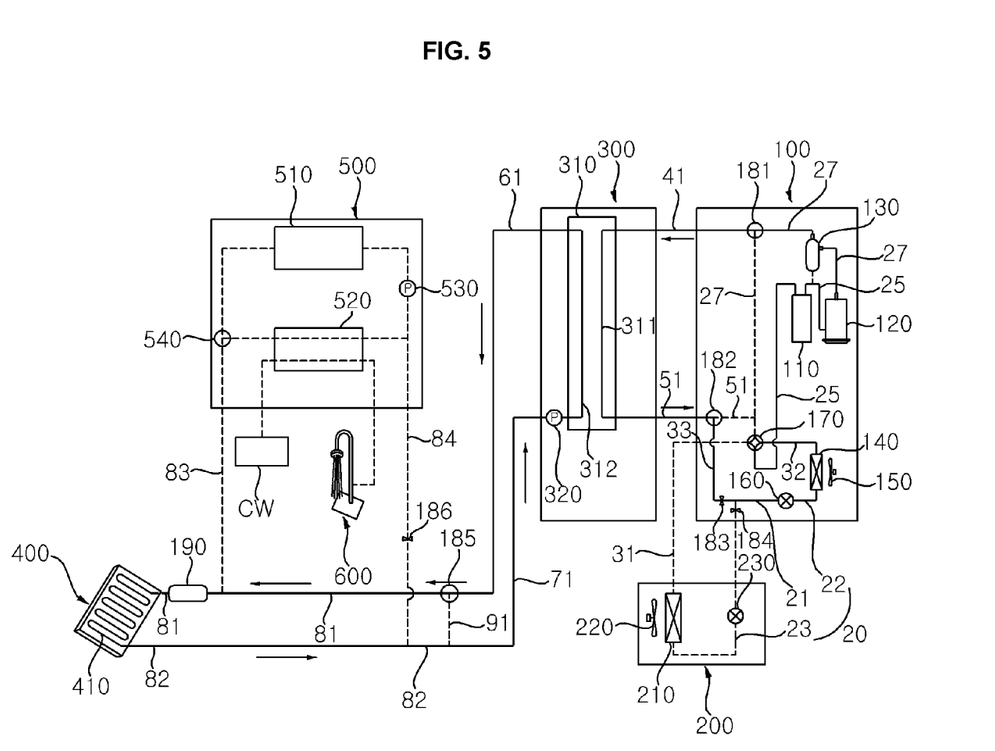

Referring to FIG. 5, when the outdoor temperature is higher than the predetermined temperature, the heat pump 10 may control the boiler 500 to be turned off so that the boiler 500 does not provide the heating function. The heat pump 10 may drive the compressor 120 to compress the refrigerant to perform the heating function, and control the refrigerant control valve 181 so that the refrigerant compressed by the compressor 120 is supplied to the water-refrigerant heat exchanger 310 of the heat exchange device 300.

Due to heat exchange with the refrigerant flowing through the refrigerant passage 311 of the water-refrigerant heat exchanger 310, water flowing through the water passage 312 of the water-refrigerant heat exchanger 310 may be heated. The heated water flowing through the water passage 312 may flow to the heating device 400 through the hot water-pipe 61 and the heating supply pipe 81. The heat pump 10 may control the hot water supply control valve 185 to be opened so that water flows from the hot-water pipe 61 to the heating supply pipe 81. The heat pump 10 may control the boiler valve 186 to be closed so that water discharged from the heating device 400 to the heating recovery pipe 82 is not supplied to the boiler 500.

Referring back to FIG. 4, when the outdoor temperature is less than the predetermined temperature ("Yes" in step S410), the heat pump 10 may control the boiler 500 to be turned on, and control each component included in the heat pump 10 to stop providing the heating function through the heat pump 10 (operation or step S430).

Figure 6A:
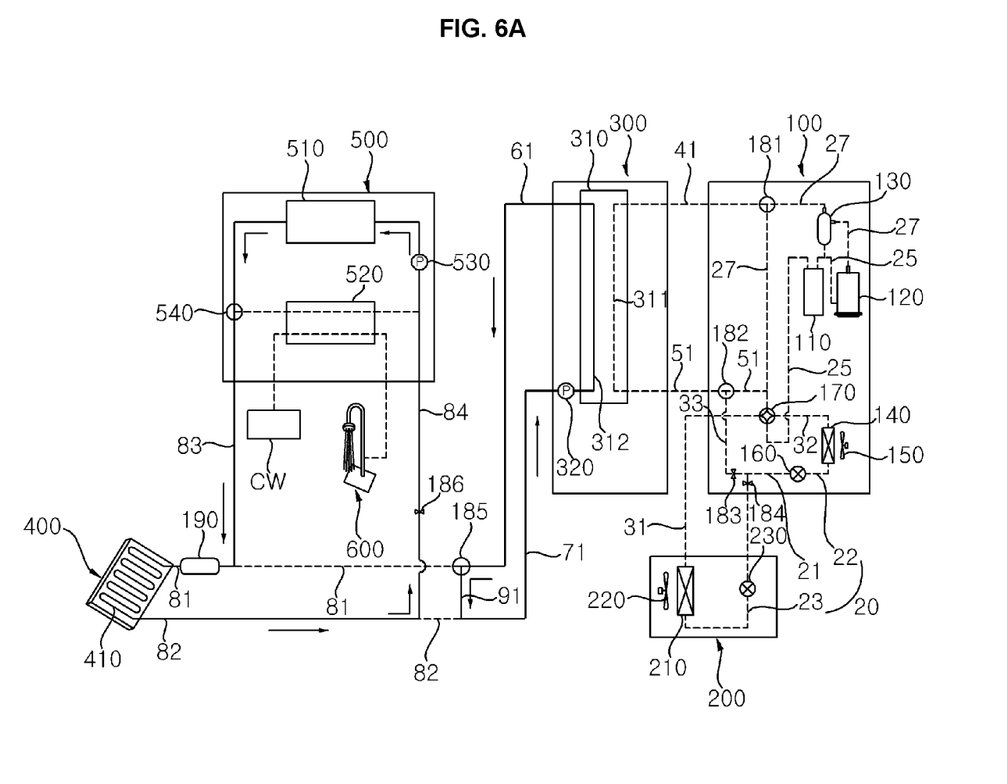

Referring to FIG. 6A, when the outdoor temperature is less than the predetermined temperature, the heat pump 10 may control the power of the boiler 500 to be turned on so that the heating function may be provided through the boiler 500. The heat pump 10 may stop the operation of the compressor 120 and may control the refrigerant control valve 181 so that the refrigerant compressed by the compressor 120 is not supplied to the water-refrigerant heat exchanger 310 of the heat exchange device 300.

The heat pump 10 may control the hot water supply control valve 185 to be closed so that water does not flow from the hot-water pipe 61 to the heating supply pipe 81, and so that water flows to the cold-water pipe 71 through the bypass pipe 91. The heat pump 10 may control the boiler valve 186 to be opened so that water discharged from the heating device 400 to the heating recovery pipe 82 is supplied to the boiler 500. The recovery pump 320 may operate so that water circulates through the water-refrigerant heat exchanger 310 to prevent freezing even when the heating function through the heat pump 10 is stopped.

Referring back to FIG. 4, the heat pump 10 may calculate a rate of change of water temperature based on the sensing value of the temperature sensor 190 (step or operation S440). For example, the heat pump 10 may calculate the rate of change of the water temperature for a predetermined time (e.g. 5 minutes) after the heating function is stopped. In this case, the heat pump 10 may monitor the rate of change of the water temperature by repeatedly calculating and updating the rate of change of the water temperature.

The heat pump 10 may determine whether the rate of change of the water temperature is less than a first predetermined rate of change (step or operation S450). The first predetermined rate of change may correspond to a minimum degree at which the temperature of water flowing through the heating pipes changes when the boiler 500 provides the heating function. For example, the first predetermined rate of change may be 0° C./min in which the temperature of water flowing through the heating pipe is constant for a predetermined time (e.g. 5 minutes).

If the heat pump 10 determines, via controller 15, that the boiler 500 is performing the heating function because the rate of change of the water temperature is greater than or equal to the first reference rate of change (e.g. 0° C./min) ("No" in step S450), step S410 may be performed. Even after the heating function by the heat pump 10 is stopped, the heat pump 10 may determine that the boiler 500 is performing a heating function when the temperature of water flowing through the heating pipes is increased or maintained constant.

If the heat pump 10 determines, via controller 15, that the boiler 500 is not performing the heating function because the rate of change of the water temperature is less than the first predetermined rate of change (e.g. 0° C./min) ("Yes" in step S450), each component included in the heat pump 10 may be controlled or turned on to perform the heating function (step or operation S460). In such a case, the boiler 500 may have stopped performing the heating function to instead perform a hot water supply function.

Figure 6B:
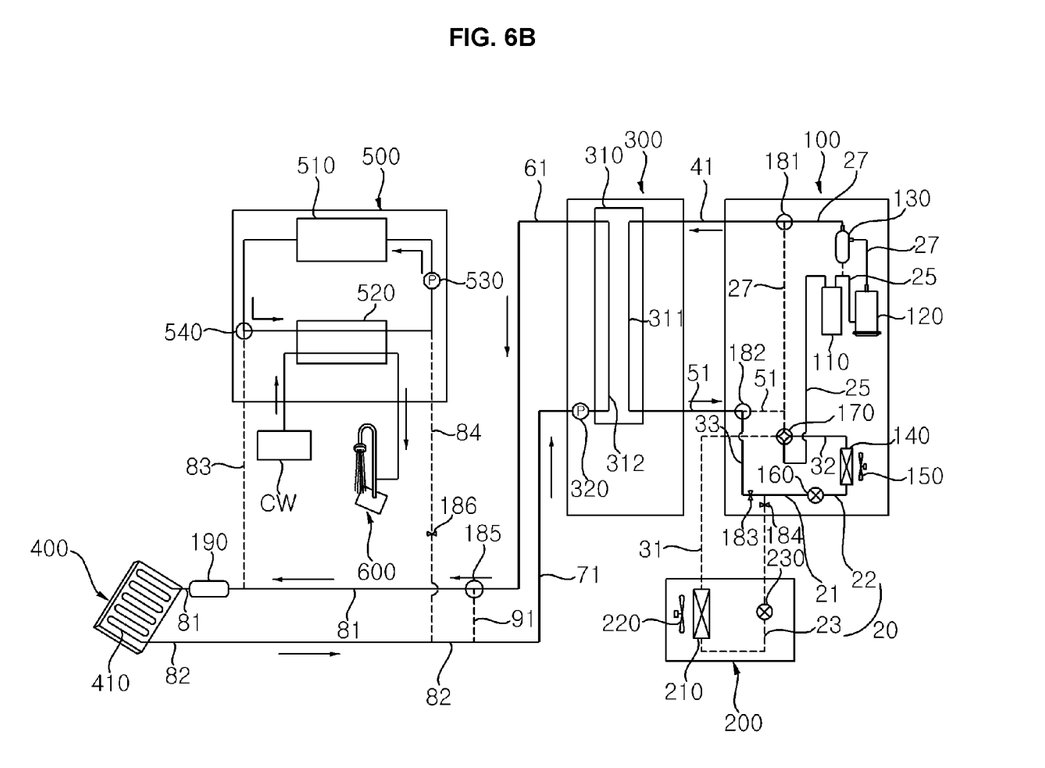

Referring to FIG. 6B, when the boiler 500 stops performing the heating function in order to provide the hot water supply function due to a demand for hot water, the temperature of the water flowing through the heating pipes may continue to decrease because the boiler 500 is not supplying hot water to the heating device 400. In this case, when the rate of change of the water temperature is less than the first predetermined rate of change (e.g. 0° C./min), the heat pump 10 may determine that the boiler 500 has stopped performing the heating function in order to perform the hot water supply function.

The heat pump 10 may, via the controller 15, drive the compressor 120 to compress the refrigerant and control the refrigerant control valve 181 so that the refrigerant compressed by the compressor 120 is supplied to the water-refrigerant heat exchanger 310 of the heat exchange device 300.

The heat pump 10 may control the hot water supply control valve 185 to be opened so that water flows from the hot-water pipe 61 to the heating supply pipe 81. The heat pump 10 may control the boiler valve 186 to be closed so that water discharged from the heating device 400 to the heating recovery pipe 82 is not supplied to the boiler 500.

Referring back to FIG. 4, the heat pump 10 may calculate the rate of change of the water temperature based on the sensing value of the temperature sensor 190 (step or operation S470). For example, the heat pump 10 may calculate the rate of change of the water temperature for a predetermined time (e.g. 5 minutes) after the performing the heating function is started. The heat pump 10, via the controller 15 and temperature sensor 190, may monitor the rate of change of the water temperature by repeatedly calculating and updating the rate of change of the water temperature flowing through the heating pipes.

The heat pump 10 may determine whether the rate of change of the water temperature exceeds a second predetermined rate of change greater than the first reference rate of change (step or operation S480). The second predetermined rate of change may correspond to a maximum degree at which the temperature of water flowing through the heating pipes changes when the heat pump 10 performs the heating function.

When the rate of change of the water temperature while the heat pump 10 performs the heating function is less than or equal to the second predetermined rate of change (e.g. 2° C./min) ("No" in step S480), the heat pump 10, via the controller 15, may determine that only the heat pump 10 (and not the boiler 500) is performing the heating function, and repeat step S470

While the heat pump 10 performs the heating function, when the rate of change of the water temperature is greater than the second predetermined rate of change ("Yes" in step S480), the heat pump 10, via the controller 15, may determine that the boiler 500 is performing the heating function (and not the hot water supply function), and stop the heat pump 10 from performing the heating function (step or operation S490).

Figure 7A:
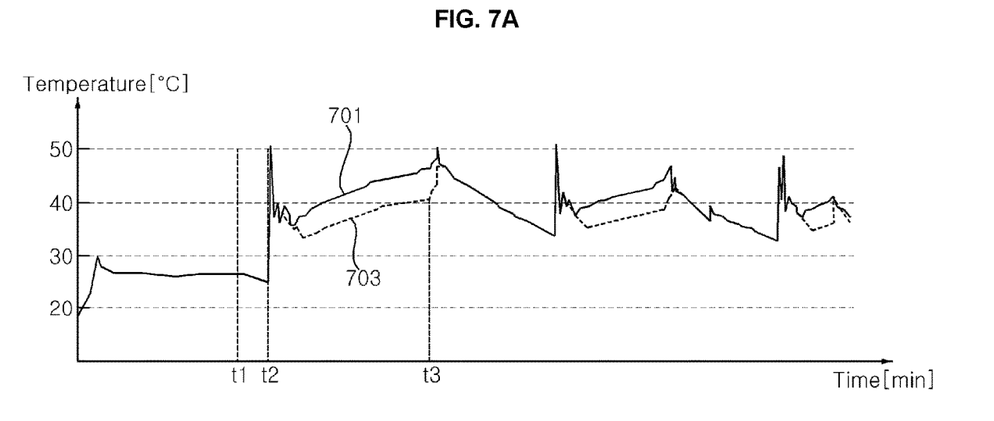
Figure 7B:
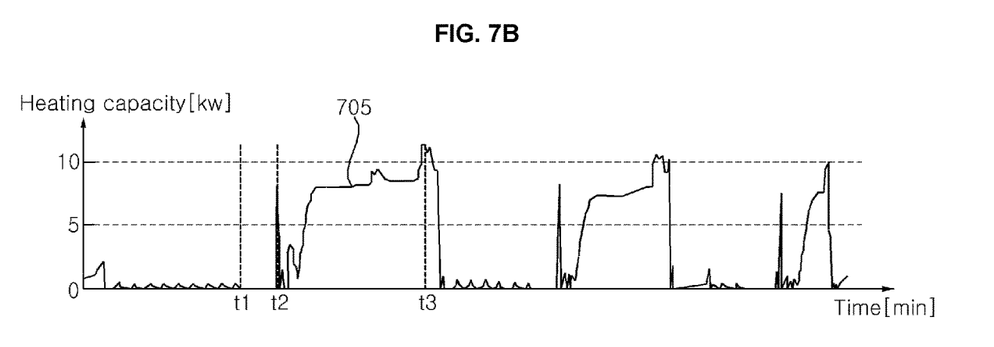
Figure 7C:
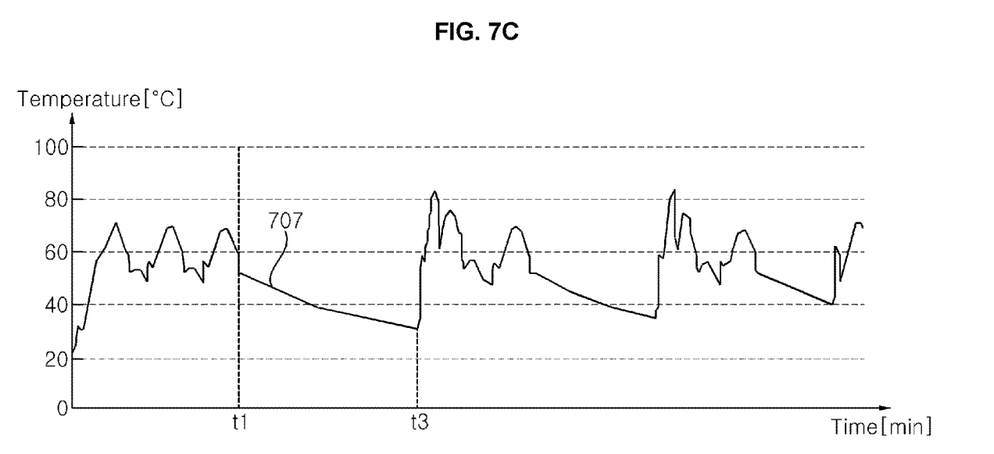

FIG. 7A is a diagram showing a graph 701 of the temperature of water flowing through the hot-water pipe 61 over time and a graph 703 of the temperature of water flowing through the cold-water pipe 71 over time. FIG. 7B is a diagram showing a graph 705 of heating capacity according to the operation of the heat pump 10 over time. FIG. 7C is a diagram showing a graph 707 of the temperature of water flowing through the boiler supply pipe 83 over time.

Referring to FIGS. 7A to 7C, while the outdoor temperature is less than the predetermined temperature (e.g. −7° C.) and only the boiler 500 performs the heating function, the temperature of the water flowing through the hot-water pipe 61 and the cold-water pipe 71 is kept fairly constant at 30° C. or less, and the heating capacity of the heat pump 10 is also maintained close to 0 kW. In addition, hot water of about 60° C. may flow through the boiler supply pipe 83 due to the heating function provided by the boiler 500.

At t1, when the user requests hot water, hot water is not discharged from the boiler 500 to the boiler supply pipe 83, and the temperature of the water flowing through the boiler supply pipe 83 continues to decrease from t1. In this case, when hot water does not flow through the boiler supply pipe 83, the temperature of the water flowing through the heating pipes continues to decrease so that the rate of change of the water temperature is calculated to be less than the first reference rate of change (e.g. 0° C./min), and the heat pump 10 may control each component included in the heat pump 10 to provide the heating function.

When the heat pump 10 controls each component included in the heat pump 10 to provide the heating function, the temperature of the water flowing through the hot-water pipe 61 and the cold-water pipe 71 temporarily increases rapidly at t2 because the water flowing in the heating pipes 81, 410, and 82 is supplied to the heat exchange device 300.

From t1, due to the heating function of the heat pump 10, the heating capacity of the heat pump 10 is maintained at a certain level, and the temperature of water flowing through the hot-water pipe 61 and the cold-water pipe 71 increases. Due to heat exchange in the heating device 400, there is a difference between the temperature of water flowing through the hot-water pipe 61 and the temperature of water flowing through the cold-water pipe 71.

At t3, when the user's request for hot water supply ends, the boiler 500 performs the heating function again, and the temperature of the water flowing through the boiler supply pipe 83 increases again due to the hot water supplied from the boiler 500. In this case, hot water supplied from the boiler 500 and hot water supplied from the heat pump 10 may flow through the heating pipes, and the temperature of the water flowing through the heating pipes 81, 410, 82 may rapidly increase. The rate of change of the water temperature may be calculated to exceed the second predetermined rate of change (e.g. 2° C./min), and the heat pump 10 may stop performing the heating function.

When the heating function of the heat pump 10 is stopped after t3, the temperature of the water flowing through the hot-water pipe 61 and the cold-water pipe 71 decreases again, and the heating capacity of the heat pump 10 is maintained close to 0 kW again.

According to the embodiments of the present disclosure, the heat pump 10, via controller 15, may determine whether the boiler 500 is performing a hot water supply function through the temperature sensor 190 arranged in the heating pipes 81, 410, 82, and the heat pump 10 may perform the heating function when the boiler 500 performs the hot water supply function so that temporary interruption of indoor heating may be prevented even if a separate hot water tank is not provided.

In addition, according to the embodiments of the present disclosure, the heat pump 10 may be interlocked with boilers of various manufacturer because the heat pump 10 may determine whether the boiler 500 provides the hot water supply function even if the heat pump 10 does not use a separate communication function and/or directly communicate with the boiler 500. According to the embodiments of the present disclosure, by temporarily using the heat pump 10 while the boiler 500 provides the hot water supply function, it is possible to minimize or reduce inefficiency of the boiler 500 and the heat pump 10 while continuously providing the heating function desired by a user.

Embodiments disclosed herein may solve the above and other problems. Embodiments disclosed herein may provide a heat pump that may determine whether a boiler provides a hot water supply function without direct communication with the boiler and provide a heating function while the boiler provides the hot water supply function. Embodiments disclosed herein may a method of controlling the heat pump to make such determinations.

Embodiments disclosed herein may be implemented as a heat pump including a compressor configured to compress a refrigerant, a first temperature sensor provided in heating pipes connected to a heating device that performs indoor heating to sense a temperature of water flowing through the heating pipes, and a controller. The controller may be configured to determine whether a boiler is performing a heating function to heat an indoor space based on a sensing value of the first temperature sensor, and control the compressor to operate when the boiler does not provide the heating function (and is assumed to be performing a hot water supply function).

Embodiments disclosed herein may be implemented as a method of controlling a heat pump comprising determining whether a boiler is performing a heating function to heat an indoor space based on a sensing value of a first temperature sensor, and operating a compressor compressing a refrigerant when the boiler is not performing the heating function. The first temperature sensor may be provided in heating pipes connected to a heating device that performs indoor heating and is configured to sense a temperature of water flowing through the heating pipes.

An additional range of applicability of the present disclosure will become apparent from the detailed description. However, because various changes and modifications will be clearly understood by those skilled in the art within the spirit and scope of the present disclosure, it should be understood that the detailed description and specific embodiments such as preferred embodiments of the present disclosure are merely given by way of example.

Since the accompanying drawings are merely for easily understanding embodiments disclosed herein, it should be understood that the technical spirit disclosed herein is not limited by the accompanying drawings, and all changes, equivalents or substitutions are included in the spirit and technical scope of the present disclosure.

Likewise, although operations are shown in a specific order in the drawings, it should not be understood that the operations are performed in the specific order shown in the drawings or in a sequential order so as to obtain desirable results, or all operations shown in the drawings are performed. In certain cases, multitasking and parallel processing may be advantageous.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

In order to clearly and briefly describe the present disclosure, components that are irrelevant to the description are omitted in the drawings. The same reference numerals are used throughout the drawings to designate the same or similar components.

Terms "module" and "part" for elements used in the following description are given simply in view of the ease of the description, and do not carry any important meaning or role. Therefore, the "module" and the "part" may be used interchangeably.

It should be understood that the terms "comprise", "include", "have", etc. when used in this specification, specify the presence of stated features, integers, steps, operations, elements, components, or combinations of them but do not preclude the presence or addition of one or more other features, integers, steps, operations, elements, components, or combinations thereof.

It will be understood that, although the terms "first", "second", etc. may be used herein to describe various elements, these elements should not be limited by these terms. These terms are only used to distinguish one element from another element.

Unless otherwise defined, all terms including technical and scientific terms used herein have the same meaning as commonly understood by one of ordinary skill in the art to which the present disclosure belongs. Further, terms defined in a common dictionary will not be interpreted in an idealized or overly formal sense unless expressly so defined herein.

In the drawings, the thicknesses or the sizes of elements and graphs may be exaggerated, omitted or simplified to more clearly and conveniently illustrate the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A heat pump, comprising:
   a compressor configured to compress a refrigerant;
   at least one heating pipe configured to connect to a heating device including a tube through which a fluid flows for heating an indoor space;
   a first temperature sensor provided in the at least one heating pipe and configured to sense a fluid temperature of fluid flowing through the at least one heating pipe; and
   a controller configured to:
      calculate a rate of change of the fluid temperature of fluid flowing through the at least one heating pipe based on the fluid temperature sensed by the first temperature sensor;
      determine whether a boiler is operating to heat the indoor space based on the calculated rate of change of the fluid temperature; and
      control the compressor based on an operation of the boiler.

2. The heat pump of claim 1, wherein the heating device is in communication with the heat pump via the at least one heating pipe.

3. The heat pump of claim 1, wherein the boiler is in communication with the heat pump via the at least one heating pipe.

4. The heat pump of claim 1, further comprising a second temperature sensor configured to sense an outdoor temperature, wherein when the outdoor temperature is sensed to be less than a predetermined temperature, the controller is configured to determine whether the boiler is operating to heat the indoor space and controls the compressor based on the fluid temperature sensed by the first temperature sensor.

5. The heat pump of claim 4, wherein the controller is configured to control the compressor to stop operating when the outdoor temperature sensed by the second temperature sensor is less than the predetermined temperature, and control the compressor to operate when the outdoor temperature sensed by the second temperature sensor is higher than the predetermined temperature.

6. The heat pump of claim 5, wherein, when the outdoor temperature is sensed to be less than the predetermined temperature, the controller is configured to calculate the rate of change of the fluid temperature based on a plurality of fluid temperatures sensed by the first temperature sensor.

7. The heat pump of claim 1, wherein the controller is configured to determine that the boiler is not operating to heat the indoor space when the calculated rate of change of the fluid temperature is less than a first predetermined rate, and determine that the boiler is operating to heat the indoor space when the calculated rate of change of the fluid temperature exceeds a second predetermined rate that is greater than the first predetermined rate.

8. The heat pump of claim 1, further comprising:
a first heat exchanger configured to exchange heat between the fluid and the refrigerant;
a hot fluid pipe through which fluid discharged from the first heat exchanger flows; and
a first valve provided between the at least one heating pipe and the hot fluid pipe, wherein the controller is configured to control the first valve to be closed to prevent a flow of fluid from the hot fluid pipe to the at least one heating pipe.

9. The heat pump of claim 8, further comprising:
a cold fluid pipe through which fluid supplied to the first heat exchanger flows; and
a bypass pipe connecting the first valve and the cold fluid pipe, wherein the at least one heating pipe is connected to the first valve, and wherein the fluid discharged from the first heat exchanger and flowing through the hot fluid pipe flows through the bypass pipe when the first valve is closed.

10. The heat pump of claim 9, wherein the at least one heating pipe includes a plurality of heating pipes respectively connected to the first valve and the boiler.

11. The heat pump of claim 10, further comprising:
a second temperature sensor configured to sense an outdoor temperature, wherein when the outdoor temperature is sensed to be less than a predetermined temperature, the controller controls the compressor based on the fluid temperature sensed by the first temperature sensor;
a boiler recovery pipe through which fluid supplied to the boiler flows; and
a second valve provided in the boiler recovery pipe, wherein the controller is configured to control the second valve to be closed so that fluid is not supplied to the boiler when:
the outdoor temperature sensed by the second temperature sensor is higher than the predetermined temperature, or
the outdoor temperature sensed by the second temperature sensor is less than the predetermined temperature, and when the calculated rate of change of the fluid temperature sensed by the first temperature sensor is less than a first predetermined rate, indicating that the boiler is not operating to heat an indoor space.

12. The heat pump according to claim 11, wherein:
the cold fluid pipe is connected to the heating device so that fluid discharged from the heating device flows through the cold fluid pipe; and
the boiler recovery pipe is connected to the cold fluid pipe.

13. A method of controlling a heat pump, the method comprising:
sensing via a first temperature sensor a fluid temperature of fluid flowing through at least one heating pipe;
calculating a rate of change of the fluid temperature of the fluid flowing through the at least one heating pipe based on the fluid temperature sensed by the first temperature sensor;
determining whether a boiler is operating to heat an indoor space based on the calculated rate of change of the fluid temperature; and
operating a compressor configured to compress a refrigerant based on an operation of the boiler, wherein the first temperature sensor is provided in the at least one heating pipe to sense the fluid temperature of fluid flowing through the at least one heating pipe, and wherein the at least one heating pipe is connected to a heating device including a tube through which a fluid flows for heating the indoor space.

14. The method of claim 13, wherein the determining of whether the boiler is operating to heat the indoor space based on the fluid temperature sensed by the first temperature sensor is performed when a second temperature sensor configured to sense an outdoor temperature senses that the outdoor temperature value that is less than a predetermined temperature.

15. The method of claim 14, further comprising:
stopping operation of the compressor when the outdoor temperature sensed by the second temperature sensor is less than the predetermined temperature; and
operating the compressor when the outdoor temperature sensed by the second temperature sensor is higher than the predetermined temperature.

16. The method of claim 13, wherein the determining of whether the boiler is operating to heat the indoor space based on the calculated rate of change comprises:
determining that the boiler is not operating to heat the indoor space when the calculated rate of change is less than a first predetermined rate; and
determining that the boiler is operating to heat the indoor space when the calculated rate of change exceeds a second predetermined rate that is greater than the first reference rate.

17. A heating system, comprising:
a boiler having a combustion heating device to heat a first fluid and a first heat exchanger configured to exchange heat between the first fluid and a second fluid;
a dispenser configured to dispense the heated second fluid to a user; and
a heat pump including:
a compressor to compress a third fluid;
a temperature sensor provided in at least one heating pipe connected to the tube and configured to sense a temperature of the first fluid flowing through the at least one heating pipe;

an outdoor unit provided in an outdoor space and having a second heat exchanger to exchange heat between air of the outdoor space and the third fluid, an indoor unit provided in an indoor space and having a third heat exchanger to exchange heat between air of the indoor space and the third fluid, and a fourth heat exchanger to exchange heat between the third fluid and the first fluid, wherein the heat pump is configured to:

calculate a rate of change of the temperature of the first fluid flowing through the at least one heating pipe based on the temperature of the first fluid sensed by the temperature sensor, determine whether the boiler is operating to heat the indoor space based on the calculated rate of change of the temperature of the first fluid, and operate the compressor based on an operation of the boiler.

* * * * *